(12) United States Patent
Kaminski et al.

(10) Patent No.: US 9,223,542 B2
(45) Date of Patent: Dec. 29, 2015

(54) VARIABLE-SIZED BUFFERS MAPPED TO HARDWARE REGISTERS

(71) Applicant: Advanced Micro Devices, Inc., Sunnyvale, CA (US)

(72) Inventors: Patryk Kaminski, Austin, TX (US); Thomas R. Woller, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 72 days.

(21) Appl. No.: 13/898,326

(22) Filed: May 20, 2013

(65) Prior Publication Data

US 2014/0344489 A1    Nov. 20, 2014

(51) Int. Cl.
*G06F 3/00* (2006.01)
*G06F 5/08* (2006.01)
*G06F 13/00* (2006.01)

(52) U.S. Cl.
CPC ....................................... *G06F 5/08* (2013.01)

(58) Field of Classification Search
CPC ............................. G06F 13/00; G06F 2003/00
USPC ............................... 710/5, 52–57, 24, 33, 310
See application file for complete search history.

(56) References Cited

U.S. PATENT DOCUMENTS

| 6,182,177 | B1 * | 1/2001 | Harriman ..................... 710/112 |
| 7,127,534 | B2 * | 10/2006 | Jackson et al. ................. 710/52 |
| 2001/0018734 | A1 * | 8/2001 | Lie .................................. 712/43 |
| 2003/0005185 | A1 * | 1/2003 | Kolli et al. ........................ 710/5 |
| 2005/0102440 | A1 * | 5/2005 | Higaki et al. ..................... 710/5 |
| 2006/0190662 | A1 * | 8/2006 | Ogilvie et al. ................ 710/310 |
| 2006/0236008 | A1 * | 10/2006 | Asano et al. .................. 710/110 |
| 2008/0301697 | A1 * | 12/2008 | Southgate et al. ............ 718/105 |

* cited by examiner

*Primary Examiner* — Christopher Shin
(74) *Attorney, Agent, or Firm* — Park, Vaughan, Fleming & Dowler LLP (57) ABSTRACT

An interface includes a first hardware register field to store respective chunks of a command directed to a device and respective chunks of a response to the command from the device. The interface also includes a second hardware register field to store a size of the command and a size of the response. The first and second hardware register fields are accessible by the device and by a processor external to the device that generates the command, in response to memory not being available to buffer the command and the response.

18 Claims, 4 Drawing Sheets

VARIABLE-SIZED BUFFERS MAPPED TO HARDWARE REGISTERS

TECHNICAL FIELD

The present embodiments relate generally to communications in a computer system, and more specifically to communications performed using hardware registers.

BACKGROUND

A processor may use memory buffers to communicate with external devices. For example, a command issued by the processor and directed to an external device may be conveyed to the external device through a first memory buffer. A response to the command may be conveyed from the external device back to the processor through a second memory buffer. At times during operation of the processor, however, these memory buffers may not be available.

SUMMARY

Embodiments are disclosed in which variable-sized buffers for conveying commands and responses are mapped onto hardware register fields.

In some embodiments, a method of buffering data is performed in a processor in response to memory not being available to buffer a command directed to an external device. The method includes writing a first chunk of the command to a first hardware register field and writing a size of the command to a second hardware register field. The first chunk comprises all or a portion of the command.

In some embodiments, an interface includes a first hardware register field to store respective chunks of a command directed to a device and respective chunks of a response to the command from the device. The interface also includes a second hardware register field to store a size of the command and a size of the response. The first and second hardware register fields are accessible by the device and by a processor external to the device that generates the command, in response to memory not being available to buffer the command and the response.

In some embodiments, a non-transitory computer-readable storage medium stores one or more programs configured to be executed by a processor. The one or more programs include instructions to write a first chunk of a command directed to an external device to a first hardware register field in response to memory not being available to buffer the command. The first chunk includes all or a portion of the command. The one or more programs also include instructions to write a size of the command to a second hardware register field, in response to the memory not being available to buffer the command.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
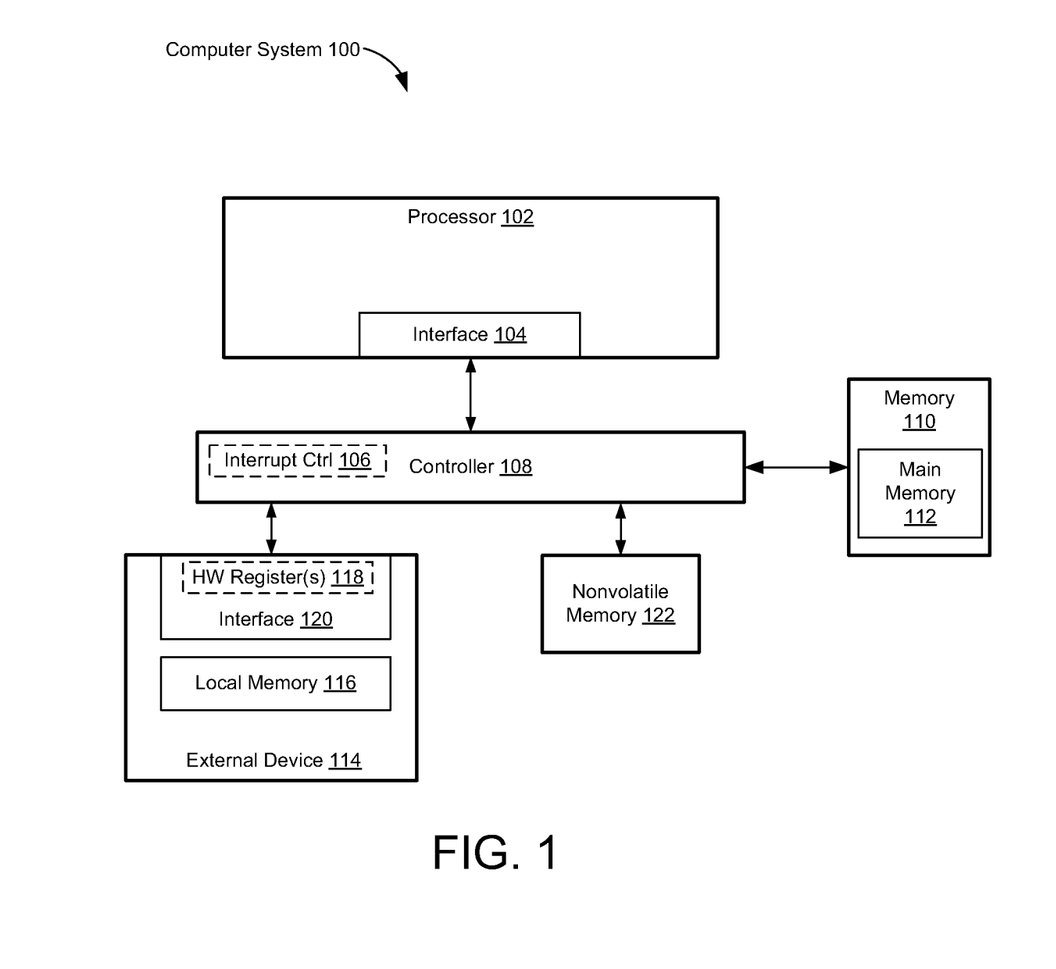
FIG. 1 is a block diagram of a computer system in accordance with some embodiments.

FIG. 1 is a block diagram of a computer system 100 in accordance with some embodiments. The computer system 100 includes a processor 102. In some embodiments, the processor 102 includes one or more processor cores, such as one or more central processing unit (CPU) cores. For example, the processor 102 may be a CPU. The one or more processor cores may be homogeneous or heterogeneous. The processor also may include a graphics processing unit (GPU). For example, the processor 102 may be an accelerated processing unit (APU) that includes a CPU with one or more CPU cores and also includes a GPU.

A controller 108 couples the processor 102 to memory 110. Memory 110 includes main memory 112 and may also include one or more levels of cache memory (not shown). In some embodiments, main memory 112 in the memory 110 is implemented using dynamic random-access memory (DRAM) and cache memory (if any) in the memory 110 is implemented using static random-access memory (SRAM). The processor 102 may also include one or more levels of cache memory (e.g., SRAM). For example, the processor 102 may include a level-one data cache and a level-one instruction cache for each processor core, and may also include one or more lower levels of cache memory (e.g., level-two cache or both level-two cache and level-three cache).

The controller 108 also couples the processor 102 to one or more external devices 114. External devices 114 are referred to as "external" because they are external to the processor 102. Examples of external devices 114 include, but are not limited to, a security processor, a sensor (e.g., a temperature sensor), a bus controller (e.g., a universal serial bus (USB) controller), a network controller, and a GPU. (While only a single external device 114 is shown in FIG. 1, the computer system 100 may include multiple external devices 114.) An external device 114 may include local memory 116.

In some embodiments, a respective external device 114 is implemented on a separate semiconductor die (and thus in a separate integrated circuit on a separate chip) from the processor 102. Alternatively, a respective external device is implemented on the same semiconductor die (and thus in the same integrated circuit and same chip) as the processor 102 (e.g., as a separate part of a system-on-a-chip (SOC) that includes the processor 102).

While the controller 108 is shown as a single element, it may include two or more distinct elements. For example, the controller 108 may include a memory control element (e.g., a Northbridge) to control communications between the processor 102 and the memory 110, and may also include an input/output (I/O) control element (e.g., a Southbridge) to control communications between the processor 102 and one or more external devices 114.

The controller 108 also may couple the processor 102 to one or more types of nonvolatile memory 122. Examples of nonvolatile memory 122 include, but are not limited to, read-only memory (ROM) (e.g., a boot ROM), Flash memory, and a hard disk drive. The nonvolatile memory 122 may store instructions to be executed by the processor 102. For example, the nonvolatile memory 122 may store instructions that the processor 102 executes at times when access to the memory 110 is not available.

The operating system running on the processor 102 may control access by the processor 102 to the memory 110 and/or to local memory 116 in one or more external devices 114. The processor 102 may use memory buffers in the memory 110 (e.g., in main memory 112) and/or in local memory 116 to communicate with external devices 114. For example, a command issued by the processor 102 and directed to an external device 114 may be conveyed to the external device 114 through a first memory buffer. A response to the command may be conveyed from the external device 114 back to the processor 102 through a second memory buffer.

At times during operation of the processor 102, however, the memory 110 (e.g., main memory 112) and/or local memory 116 may not be available, such that memory buffers are not available. Commands and responses therefore cannot be conveyed between the processor 102 and external device 114 using memory buffers at these times. For example, memory buffers are not available during initial boot (e.g., when the operating system is not yet running), before memory has been trained, during a suspend state, during a power transition, during a debug mode, or as a result of a hardware problem.

In some embodiments, the external device 114 includes an interface 120 with one or more hardware registers 118 that may be used to convey commands and responses between the processor 102 and the external device 114 when memory buffers are not available. Buffers used for commands and responses may be mapped onto the hardware register(s) 118. Transitions between using the hardware register(s) 118 to convey commands and responses and using memory buffers to convey commands and responses may occur seamlessly, depending on the availability of the memory buffers. For example, the hardware register(s) 118 are used a first mode of operation, when memory buffers are not available, and memory buffers are used in a second mode of operation. Furthermore, buffers that are mapped onto the hardware register(s) 118 may be of variable sizes, to accommodate variable-sized commands and responses. An interface 104 in the processor 102 includes a mechanism for communicating with the hardware register(s) 118.

While the hardware register(s) 118 are shown in FIG. 1 as being situated in the external device 114, they may alternatively be situated elsewhere. For example, they may be situated in the processor 102 (e.g., in the interface 104), controller 108, or memory 110. In such embodiments, the interface 120 in the external device 114 includes a mechanism for communicating with the hardware register(s) 118.

The computer system 100 may include an interrupt controller 106 (e.g., in the controller 108) to handle asynchronous interrupts received from the external device 114. In some embodiments, asynchronous interrupts are used in conjunction with the hardware register(s) 118 to convey commands and/or responses (e.g., as described below with respect to the methods 300 and 400, FIGS. 3 and 4).

Figure 2:
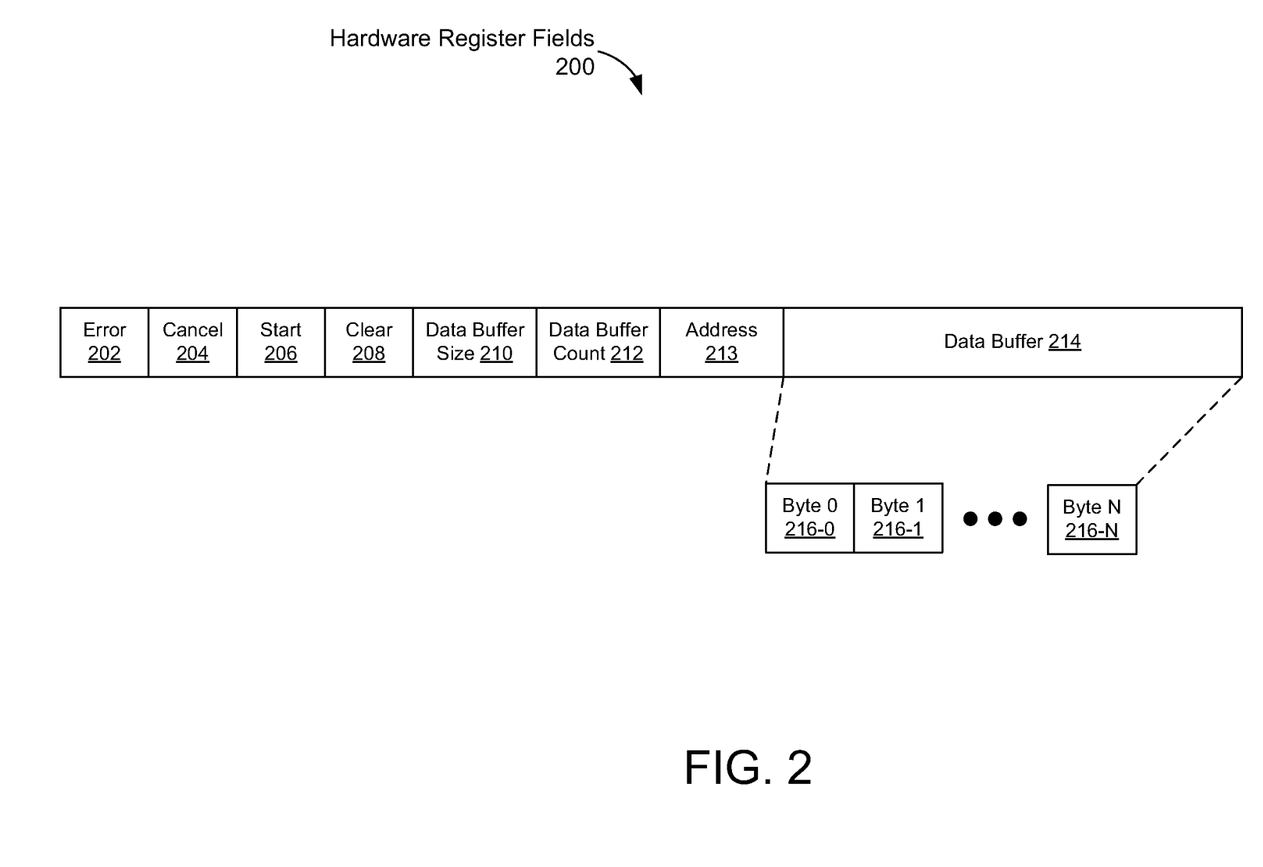
FIG. 2 is a block diagram of a plurality of hardware register fields in accordance with some embodiments.

The hardware register(s) 118 include various hardware register fields 200, as shown in FIG. 2 in accordance with some embodiments. The hardware register fields 200 may be implemented in a single hardware register 118 or may be distributed among multiple hardware registers 118 (e.g., in the interface 120). In the example of FIG. 2, the hardware register fields 200 include an error field 202, cancel field 204, start field 206, clear field 208, data buffer size field 210, data buffer count field 212, address field 213, and data buffer field 214.

In some embodiments, the data buffer field 214 is divided into N+1 bytes numbered 0 to N (where N is an integer greater than or equal to 0), including a first byte 216-0, a second byte 216-1, and an (N+1)th byte 216-N. The size of the data buffer field 214 is indicated by a value stored in the data buffer size field 210. For example, the data buffer size field 210 stores a value that indicates the number of bytes in the data buffer field 214.

The address field 213, which may also be referred to as a command buffer address field, stores a value indicating that a buffer is mapped into the data buffer field 214 (e.g., into the bytes 216-0 through 216-N) when memory buffers are not available. The address field 213 thus provides an indication of whether or not memory buffers are available and therefore whether or not the data buffer field 214 is to be used to convey commands and responses. In some embodiments, the address field 213 stores a value that points to the data buffer field 214 (e.g., to a first portion of the data buffer field 214, such as the first byte 216-0) when memory buffers are not available and the data buffer field 214 is to be used to convey commands and responses. In some embodiments, the address field 213 stores a predefined value (e.g., '0') when memory buffers are not available and the data buffer field 214 is to be used to convey commands and responses.

A command or response may be stored in the data buffer field 214 in chunks, with each chunk having a size (e.g., in bytes) that is less than or equal to the size of the data buffer field 214. If the size of the command or response is less than or equal to the size of the data buffer field 214, then the command or response is stored in the data buffer field 214 as a single chunk. If the size of the command or response is greater than the size of the data buffer field 214, then the command or response is stored in the data buffer field 214 in successive chunks, with one chunk being stored in the data buffer field 214 at a time. The device to which the command or response is directed (e.g., the external device 114 for a command, or the processor 102 for a response) reads the successive chunks from the data buffer field 214.

The data buffer count field 212 stores the sizes of commands and responses. For example, when a first chunk of a command or response is written to the data buffer field 214, the size of the command or response is written to the data buffer count field 212. In some embodiments, when subsequent chunks of a command or response is written to the data buffer field 214, a remaining size of the command or response is written to the data buffer count field 212. The remaining size equals the total size of the command or response minus the sizes of previously written chunks, and thus indicates the amount of the command or response that has not yet been read by the device to which the command or response is directed. In some embodiments, the device to which the command or response is directed (e.g., the external device 114 for a command, or the processor 102 for a response) sets the data buffer count field 212 to zero (or another specified value) after reading a respective chunk, to indicate that it is ready to receive another chunk.

The start field 206 may be used to indicate availability of new commands and/or new responses. For example, the processor 102 may set the start field 206 to a first specified value (e.g., '1') to indicate that a first chunk of a new command has been stored in the data buffer field 214. The external device 114 may reset the start field 206 to a second specified value (e.g., '0') to indicate that the command has been completed and/or that a response is available in the data buffer field 214.

The processor 102 may set the clear field 208 to a specified value (e.g., '1') to indicate to the external device 114 that a command is being aborted and that no further chunks of the command will be provided. The clear field 208 thus may be set to instruct the external device 114 that transmission of the command is being aborted. In some embodiments, the processor 102 also may set the clear field 208 to the specified value (e.g., '1') after providing the entire command to the external device 114 through the data buffer field 214, to instruct the external device 114 not to provide a response or to stop providing the response (e.g., to abort the response). The clear field 208 thus may be set to instruct the external device 114 to abort transmission of the response. The external device 114 may poll the clear field 208.

The processor 102 may set the cancel field 204 to a specified value (e.g., '1') to instruct the external device 114 to abort processing of the command. For example, the cancel field 204 may be set after every chunk of the command has been provided to the external device 114 through the data buffer field 214. The external device 114 may poll the cancel field 204 to determine whether or not to abort the command.

The error field 202 may store one or more error codes indicating occurrence of errors related to respective commands. For example, if the external device 114 is a security processor, it may write an error code to the error field 202 indicating a lack of privilege to execute the command. In another example, if the external device 114 is a network controller, it may write an error code to the error field 202 indicating that data associated with a command was not transmitted or was corrupted. In yet another example, if the external device 114 is a bus controller (e.g., a USB controller), it may write an error code to the error field 202 indicating that another device has been disconnected from the bus. Other examples are possible.

In some embodiments, the cancel field 204, start field 206, and clear field 208 are single-bit flags. Alternatively, the cancel field 204, start field 206, and clear field 208 are multi-bit fields. For example, each of these fields may be a specified number of bytes (e.g., four bytes), and all but one of the bits in each field may be unused. The size of the data buffer field 214 is arbitrary. The data buffer size field 210 and data buffer count field 212 may be sized in accordance with the size of the data buffer field 214. In one example, the error field 202, data buffer size field 210, and data buffer count field 212 are each a specified number of bytes (e.g., four bytes).

Figure 3:
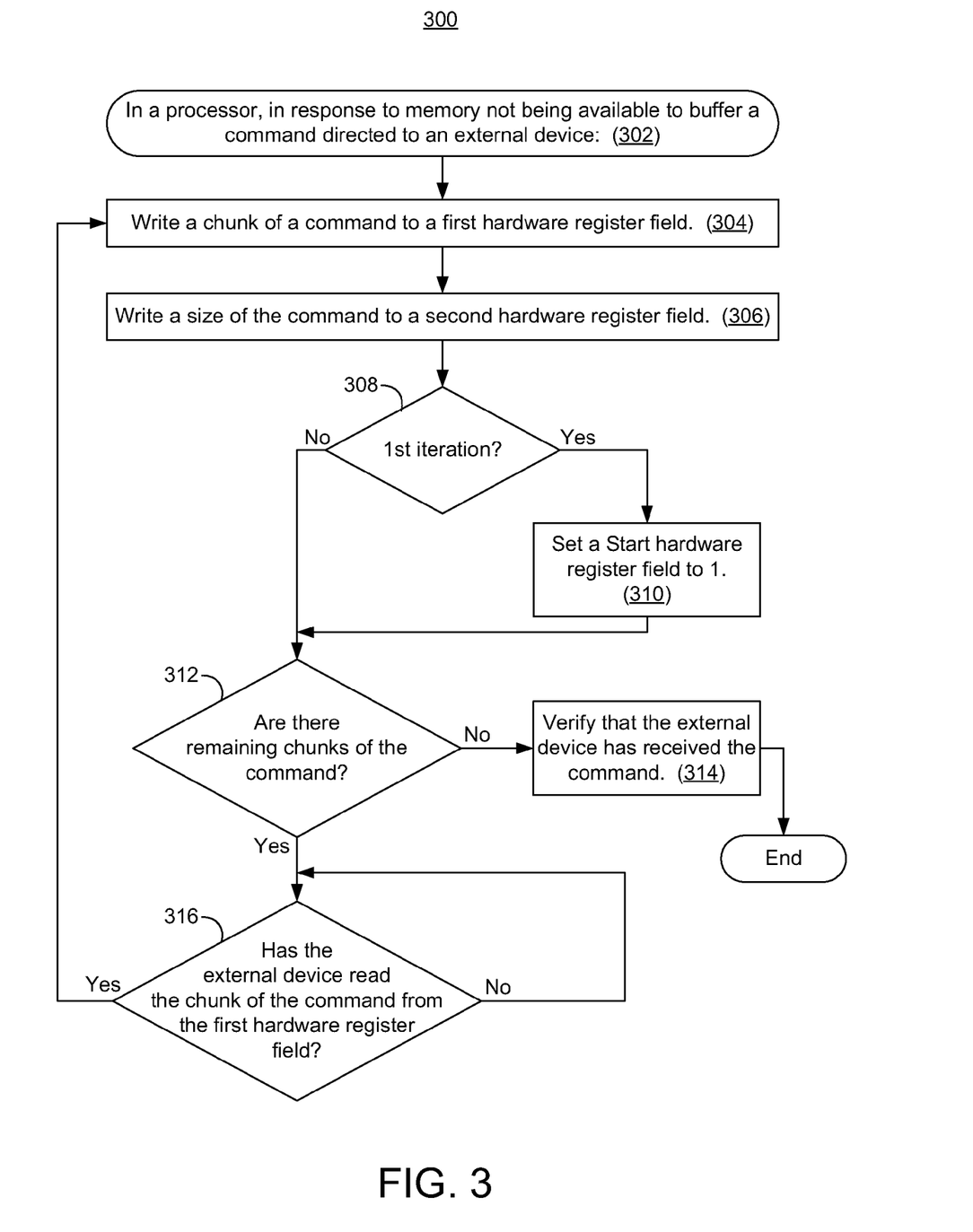
FIG. 3 is a flowchart showing a method of buffering a command, in accordance with some embodiments.

FIG. 3 is a flowchart showing a method 300 of buffering a command, in accordance with some embodiments. The method 300 is performed (302) in the processor 102, in response to memory not being available to buffer a command directed to an external device (e.g., as indicated by the address field 213 storing a specified value, such as a pointer to the data buffer field 214 or another predefined value). For example, the method 300 is performed by software running on the processor 102.

A chunk of a command is written (304) to a first hardware register field (e.g., the data buffer field 214). The chunk of the command is written, for example, in response to the address field 213 storing the specified value that indicates memory buffers are not available. If the chunk is the first chunk of the command to be written to the first hardware register field (i.e., for a first iteration of the loop in the method 300), then the size of the chunk is the lesser of the size of the command and the size of the first hardware register field:

chunk size=min(command size, size of first h/w register field).

If the chunk is a subsequent chunk of the command (i.e., for a subsequent iteration of the loop in the method 300), then the size of the chunk is the lesser of the remaining size of the command and the size of the first hardware register field:

chunk size=min(remaining command size, size of first h/w register field).

A size of the command is written (306) to a second hardware register field (e.g., the data buffer count field 212). If the chunk written in the previous operation 304 was the first chunk of the command (i.e., for the first iteration of the loop), the total size of the command is written (306) to the second hardware register field. If the chunk written in the previous operation 304 was a subsequent chunk of the command (i.e., for a subsequent iteration of the loop), the remaining size of the command is written (306) to the second hardware register field.

In some embodiments, once the first chunk has been written (304) to the first hardware register field and the size of the command has been written (306) to the second hardware register field, the start field 206 is set (310) to a specified value (e.g., '1') to indicate to the external device 114 that the first chunk of the command is available in the first hardware register field. The start field 206 is only set (310) for a first iteration of the loop in the method 300 (i.e., in response to a determination 308—Yes). For subsequent iterations (308—No), the operation 310 of setting the start field 206 is skipped.

The external device 114 may poll the start field 206 to determine when the start field 206 has been set and therefore when the first chunk of the command is available. Alternatively, the external device 114 determines that the first chunk of the command is available by polling the second hardware register field (e.g., the data buffer count field 212) until a non-zero value is detected. The start field 206 and/or the operation 310 of setting it therefore may be omitted in accordance with some embodiments.

Once the external device 114 determines that the chunk is available, it reads the chunk from the first hardware register field (e.g., the data buffer field 214). It may provide an indication that it has read the chunk. For example, it may set the second hardware register field (e.g., the data buffer count field 212) to zero (or another specified value). Alternatively, it may send a signal (e.g., an asynchronous interrupt) to the processor 102 (e.g., via the interrupt controller 106). If the chunk is the final chunk, it may reset the start field 206 to '0' (e.g., once it completes execution of the command).

A determination is made (312) if there are any remaining chunks of the command that have not yet been written to the first hardware register field. This determination is made, for example, by comparing the value stored in the second hardware register field (e.g., the data buffer count field 212) to the value in the data buffer size field 210. If the value stored in the second hardware register field is greater than the value in the data buffer size field 210, then there are remaining chunks of the command (312—Yes); otherwise, there are no remaining chunks of the command (312—No).

If there are no remaining chunks of the command (312—No), the processor 102 may verify (314) that the external device 114 has received the command. For example, the processor 102 polls the start field 206 to determine whether it has been reset to zero or polls the second hardware register field (e.g., the data buffer count field 212) to determine whether it has been set to zero (or another specified value). Alternatively, the processor 102 determines that the command was received based on a signal (e.g., an asynchronous interrupt) from the external device 114 (e.g., as received via the interrupt controller 106). After verifying (314) that the external device 114 has received the command, the method 300 ends.

If there are remaining chunks of the command (312—yes), the processor 102 determines (316) whether the external device 114 has read the chunk of the command that was written (304) to the first hardware register field during the current iteration of the loop. For example, the processor 102 polls the second hardware register field (e.g., the data buffer count field 212) until it detects that the second hardware register field has been set to zero (or another specified value). Alternatively, it waits until it receives a signal (e.g., an asynchronous interrupt) from the external device 114 (e.g., via the interrupt controller 106).

Once the processor 102 determines (316—Yes) that the external device 114 has read the chunk, performance of the method 300 reverts to the operation 304, and another iteration of the loop is performed.

In some embodiments, the method 300 may be aborted after one or more chunks of the command have been provided to the external device 114. To abort the method 300, the processor 102 (e.g., software running on the processor 102) sets the clear field 208 to a specified value (e.g., '1'). The external device 114 may poll the clear field 208. Upon detecting that the clear field 208 has been set to the specified value, the external device 114 discards the chunks of the command that it has already read and resets the mechanism in its interface 120 that reads the hardware register(s) 118, in preparation for receiving a subsequent command.

In some embodiments, the processor 102 (e.g., software running on the processor 102) may decide to abort the command after the entire command has been provided to the external device 114 (e.g., after the method 300 has been completed). To abort the command in this situation, the processor 102 sets the cancel field 204 to a specified value (e.g., '1'). In some embodiments, the external device 114 polls the cancel field 204. If it detects that the cancel field 204 has been set to the specified value, it does not execute the command, or aborts execution of the command.

Two examples of the method 300 are now provided. In both examples, the first hardware register field is the data buffer field 214, the second hardware register field is the data buffer count field 212, and the size of the data buffer field 214 is 16 bytes.

In the first example, the total size of the command (i.e., the command data length) is 11 bytes, which is less than the size of the data buffer field 214. The processor 102 (e.g., software running on the processor 102) writes (304) all 11 bytes of the command to the data buffer field 214, writes (306) the size of the command (i.e., 11) to the data buffer count field 212, and sets (310) the start field 206 to '1'. Since there are no remaining chunks (312—No), the processor 102 polls the start field 206 until it detects that the start field 206 has been reset to '0'. The processor 102 may then read the response (e.g., in accordance with the method 400, FIG. 4, below).

In the second example, the total size of the command is 34 bytes, which is greater than the size of the data buffer field 214. The processor 102 (e.g., software running on the processor 102) writes (304) the first 16 bytes of the command to the data buffer field 214, writes (306) the total size of the command (i.e., 34) to the data buffer count field 212, and sets (310) the start field 206 to '1'. The processor 102 polls the data buffer count field 212 until it detects that the data buffer count field 212 has been set to zero, thereby determining (316—Yes) that the external device 114 has read the first 16 bytes. The processor 102 writes (304) the next 16 bytes of the command to the data buffer field 214 and writes (306) the remaining size of the command (i.e., 34−16=18) to the data buffer count field 212. The processor 102 polls the data buffer count field 212 until it detects that the data buffer count field 212 has been set to zero, thereby determining (316—Yes) that the external device 114 has read the next 16 bytes. The processor 102 writes (304) the final two bytes of the command to the data buffer field 214 (e.g., to the first byte 216-0 and the second byte 216-1, FIG. 2) and writes (306) the remaining size of the command (i.e., 18−16=2) to the data buffer count field 212. The processor 102 polls the start field 206 until it detects that the start field 206 has been reset to '0'. The processor 102 may then read the response (e.g., in accordance with the method 400, FIG. 4, below).

Figure 4:
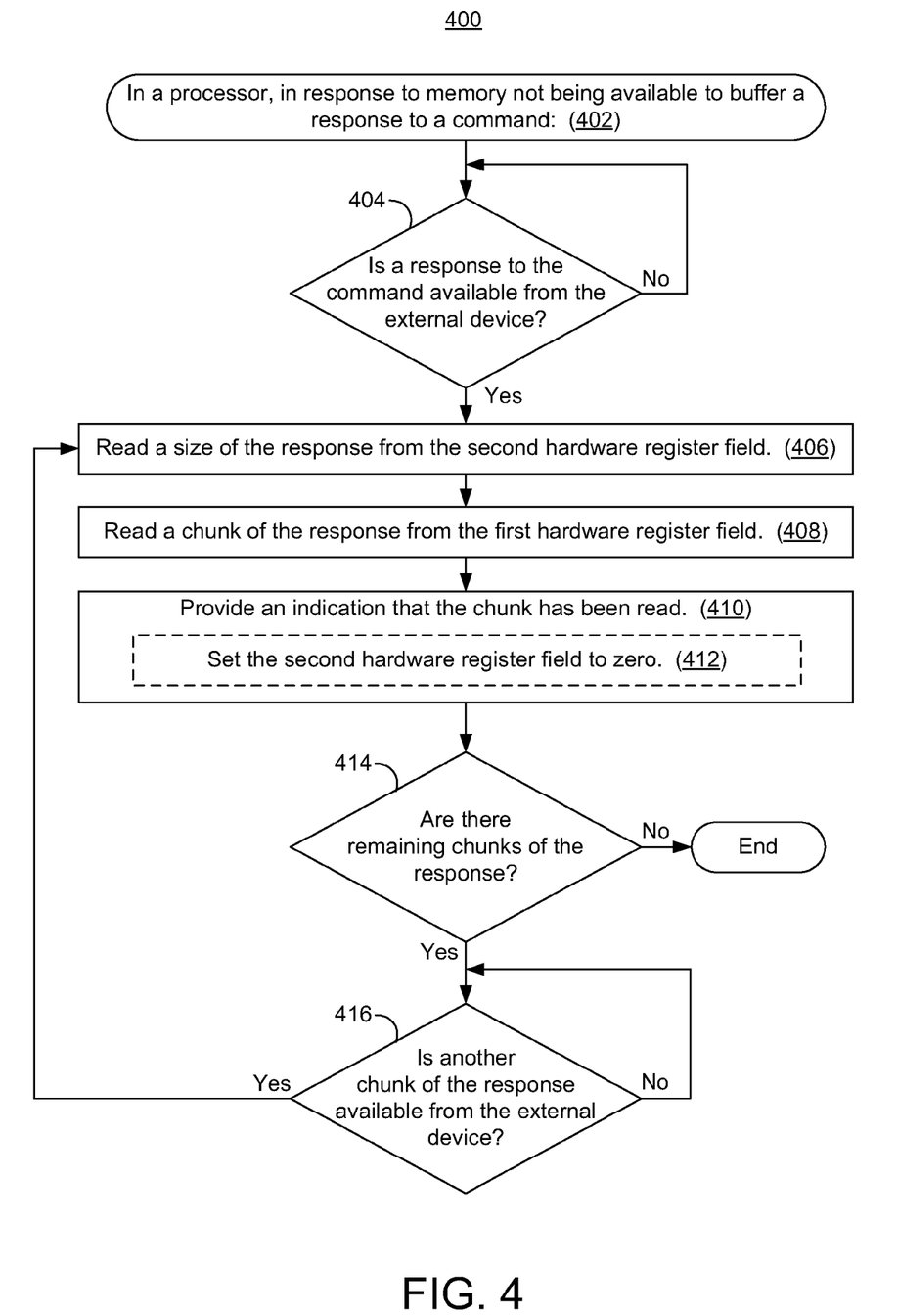
FIG. 4 is flowchart showing a method of buffering a response to a command, in accordance with some embodiments.

FIG. 4 is flowchart showing a method 400 of buffering a response to a command, in accordance with some embodiments. The method 400 is performed (402) in the processor 102 (e.g., by software running on the processor 102), in response to memory not being available to buffer a response to a command. For example, performance of the method 400 may follow performance of the method 300 (FIG. 3), to allow the processor 102 to read a response from the external device 114 to the command of the method 300.

The processor determines (404) whether a response to the command is available from the external device 114. For example, the processor 102 polls the start field 206 to determine whether it has been reset (e.g., to '0' or another specified value). Alternatively, the processor 102 determines whether a value of another of the hardware register fields 200 (e.g., the data buffer count field 212) has changed (e.g., has been set to '0' or another specified value) or whether a signal (e.g., an asynchronous interrupt) indicating that the response is available has been received from the external device 114 (e.g., via the interrupt controller 106).

A determination (404—Yes) that the response is available indicates that the external device 114 has written a first chunk of the response into the first hardware register field (e.g., the data buffer field 214) and has written the total size of the response into the second hardware register field (e.g., the data buffer count field 212). The external device 114 performs these operations once it has finished executing the command.

Once the response is available (404—Yes), the processor 102 reads (406) a size of the response from the second hardware register field (e.g., the data buffer count field 212). For a first iteration of the loop in the method 400, the size is the total size of the response. For subsequent iterations of the loop in the method 400, the size is a remaining size of the response.

The processor 102 reads (408) a chunk of the response from the first hardware register field (e.g., the data buffer field 214). The size of the chunk is the lesser of the size of the first hardware register field and the size of the response (e.g., the total response size or remaining response size) as read (406) from the second hardware field:

chunk size=min(response size, size of first h/w register field).

The processor 102 provides (410) an indication that it has read the chunk. For example, the processor 102 sets (412) the second hardware register field (e.g., the data buffer count field 212) to '0' (or another specified value).

If there are remaining chunks of the response, the external device 114 responds to this indication by writing another chunk of the response to the first hardware register field (e.g., the data buffer field 214) and writing a remaining size of the response to the second hardware register field (e.g., the data buffer count field 212). For example, the external device 114 polls the second hardware register field and performs these writes in response to detecting that the second hardware register field has been set (412) to '0'.

The processor 102 determines (414) whether there are remaining chunks of the response that it has not yet read. For example, the processor 102 compares the size of the response as read (406) from the second hardware register field (e.g., the data buffer count field 212) to the size of the first hardware register field (e.g., as provided by the data buffer size field 210). If the size of the response is less than or equal to the size of the first hardware register field, then there are no remaining chunks of the response (414—No) and the method 400 ends. If, however, the size of the response is greater than the size of the first hardware register field, then there are remaining chunks of the response (414—Yes).

The external device 114 detects the indication, as provided in the operation 410, that the chunk has been read. For example, the external device 114 polls the second hardware register field until it detects that second hardware register field has been set to zero. In response, if there are remaining chunks of the response, the external device 114 writes another chunk to the first hardware register field and writes the remaining size to the second hardware register field.

The processor 102 determines (416) whether another chunk of the response is available from the external device 114. For example, the processor 102 polls the second hardware register field until it detects a non-zero value. Once the processor determines (416—Yes) that another chunk of the response is available, performance of the method 400 reverts to the operation 406, and another iteration of the loop is performed.

In some embodiments, the processor 102 may abort the method 400, and thus abort reading the response. The determination to abort the method 400 may be made, for example, after the processor has read (408) a first chunk of the response. To abort the method 400, the processor 102 sets the clear field 208 to a specified value (e.g., '1'). The external device 114 polls the clear field 208 and ceases transmission of the response in response to detecting that the clear field 208 has been set to the specified value. Instead, the external device 114 discards the response.

Two examples of the method 400 are now provided. In both examples, the first hardware register field is the data buffer field 214, the second hardware register field is the data buffer count field 212, and the size of the data buffer field 214 is 16 bytes.

In the first example, the total size of the response (i.e., the response data length) is 11 bytes, which is less than the size of the data buffer field 214. The processor 102 (e.g., software running on the processor 102) polls the start field 206 until it detects that the start field 206 has been reset to '0', thereby determining (404—Yes) that a response is available. The processor 102 reads (406) the total size of the response (i.e., 11) from the data buffer count field 212 and reads (408) all 11 bytes of the response from the data buffer field 214. The processor 102 then sets (412) the data buffer count field 212 to '0'. Because there are no remaining chunks of the response (414—No), the method 400 ends.

In the second example, the total size of the response is 36 bytes, which is greater than the size of the data buffer field 214. The processor 102 (e.g., software running on the processor 102) polls the start field 206 until it detects that the start field 206 has been reset to '0', thereby determining (404-Yes) that a response is available. The processor 102 reads (406) the total size of the response (i.e., 36) from the data buffer count field 212, reads (408) the first 16 bytes of the response from the data buffer field 214, and sets (412) the data buffer count field 212 to '0'. The processor 102 then polls the data buffer count field 212 until it detects a non-zero value, which indicates that another chunk of the response is available (416—Yes). The processor reads (406) the remaining size of the response (i.e., 36−16=20) from the data buffer count field 212, reads (408) the next 16 bytes of the response from the data buffer field 214, and sets (412) the data buffer count field 212 to '0'. The processor 102 again polls the data buffer count field 212 until it detects a non-zero value, which indicates that yet another chunk of the response is available (416—Yes). The processor reads (406) the remaining size of the response (i.e., 20−16=4) from the data buffer count field 212, reads (408) the last four bytes of the response from the data buffer field 214 (e.g., from the first four bytes of the data buffer field 214), and sets (412) the data buffer count field 212 to '0'.

While the methods 300 (FIGS. 3) and 400 (FIG. 4) include a number of operations that appear to occur in a specific order, it should be apparent that the methods 300 and 400 can include more or fewer operations, some of which can be executed serially or in parallel. An order of two or more operations may be changed, performance of two or more operations may overlap, and two or more operations may be combined into a single operation.

While the methods 300 (FIGS. 3) and 400 (FIG. 4) are performed in the processor 102, the hardware register(s) 118 may be outside of the processor 102 (e.g., in the external device 114). Writing, reading, setting, and resetting respective hardware register fields as described in the methods 300 and 400 thus may include sending signals to and receiving signals from the hardware register(s) 118, regardless of the location of the hardware register(s) 118. Furthermore, the external device 114 may perform counterparts to the methods 300 and 400.

In some embodiments, the methods 300 (FIG. 3) and/or 400 (FIG. 4) are performed in a first mode of operation, when memory buffers are not available. In a second mode of operation, when memory buffers are available, commands and responses are conveyed between the processor 102 and external device 114 through memory buffers.

As discussed, the methods 300 (FIG. 3) and/or 400 (FIG. 4) may be performed by software running on the processor 102. This software may be stored in the nonvolatile memory 122. For example, the nonvolatile memory 122 includes a non-transitory computer-readable medium that stores instructions which, when executed by the processor 102, cause the processor 102 to perform all or a portion of the methods 300 and/or 400. The instructions may also include instructions to abort the methods 300 and/or 400 (e.g., using the clear field 208) and to cancel execution of a command provided to an external device 114 through the method 300 (e.g., using the cancel field). The instructions may further include instructions to convey commands and responses between the processor 102 and external device 114 through memory buffers (e.g., when the memory buffers are available) and to transition between the first and second modes of operation.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of buffering data, comprising:
   in a processor, in response to memory not being available to buffer a command directed to an external device:

writing a first chunk of the command to a first hardware register field, wherein the first chunk comprises all or a portion of the command; and writing a size of the command to a second hardware register field;

providing the command to the external device, the providing comprising the writing the first chunk of the command to the first hardware register field and the writing the size of the command to the second hardware register field;

determining that a response to the command is available from the external device, and in response to determining that the response is available:
reading a size of the response from the second hardware register field; and
reading a first chunk of the response from the first hardware register field, wherein the first chunk of the response comprises all or a portion of the response.

2. The method of claim 1, further comprising:
storing a specified value in a third hardware register field when memory is not available to buffer the command;
wherein the first chunk is written to the first hardware register field in response to the third hardware register field storing the specified value.

3. The method of claim 1, wherein the command comprises a plurality of chunks including the first chunk, the method further comprising:
determining that the external device has read the first chunk of the command from the first hardware register field;
writing another chunk of the command to the first hardware register field; and
writing a remaining size of the command to the second hardware register field, the remaining size indicating how much of the command has not yet been read by the external device.

4. The method of claim 3, wherein determining that the external device has read the first chunk of the command from the first hardware register field comprises determining that the second hardware register field has been set to a specified value.

5. The method of claim 1, wherein the command comprises a plurality of chunks including the first chunk, the method further comprising:
after every chunk of the command has been written to the first hardware register field, setting a fourth hardware register field to instruct the external device to abort processing of the command.

6. The method of claim 1, wherein the command comprises a plurality of chunks including the first chunk, the method further comprising:
after writing the first chunk of the command to the first hardware register field, and before every chunk of the command has been written to the first hardware register field, setting a fifth hardware register field to instruct the external device that transmission of the command is being aborted.

7. The method of claim 1, wherein the response comprises a plurality of chunks including the first chunk of the response, the method further comprising:
after reading the first chunk of the response from the first hardware register field, setting the second hardware register field to zero;
polling the second hardware register field until a non-zero value is detected; and
in response to detecting the non-zero value:
reading a remaining size of the response from the second hardware register field; and
reading another chunk of the response from the first hardware register field.

8. The method of claim 1, wherein the response comprises a plurality of chunks including the first chunk of the response, the method further comprising:
after reading the first chunk of the response from the first hardware register field, setting a fifth hardware register field to instruct the external device to abort further transmission of the response.

9. The method of claim 1, wherein:
the method further comprises setting a sixth hardware register field to indicate that the first chunk of the command is available to be read by the external device; and
determining that the response to the command is available from the external device comprises:
polling the sixth hardware register field; and
determining that the sixth hardware register field has been reset.

10. An interface, comprising:
a first hardware register field to store respective chunks of a command directed to a device and respective chunks of a response to the command from the device; and
a second hardware register field to store a size of the command and a size of the response;
wherein the first and second hardware register fields are accessible by the device and by a processor external to the device that generates the command, in response to memory not being available to buffer the command and the response;
wherein the interface:
writes a first chunk of the command to the first hardware register field, the first chunk comprising all or a portion of the command, and writes a size of the command to the second hardware register field;
provides the command to the device, the providing comprising the writing the first chunk of the command to the first hardware register field and the writing the size of the command to the second hardware register field; and
determines that a response to the command is available from the device, and, in response to determining that the response is available:
reads a size of the response from the second hardware register field; and
reads a first chunk of the response from the first hardware register field, wherein the first chunk of the response comprises all or a portion of the response.

11. The interface of claim 10, further comprising a third hardware register field to store a specified value when memory is not available to buffer the command and the response, wherein the first and second hardware register fields are accessible by the device and the processor in response to the third hardware register field storing the specified value.

12. The interface of claim 10, wherein the second hardware register field is configured to be set to a specified value to indicate that a respective chunk of the command or the response has been read from the first hardware register field.

13. The interface of claim 10, further comprising:
a fourth hardware register field to indicate to the device whether to abort processing of the command; and
a fifth hardware register field to indicate to the device whether transmission of the command is being aborted and whether to abort transmission of the response.

14. The interface of claim 10, further comprising a sixth hardware register field to store a first value indicating that the command is available and a second value indicating that the response is available.

15. A non-transitory computer-readable storage medium storing one or more programs configured to be executed by a processor, the one or more programs comprising:
   instructions to write a first chunk of a command directed to an external device to a first hardware register field in response to memory not being available to buffer the command, wherein the first chunk comprises all or a portion of the command; and
   instructions to write a size of the command to a second hardware register field, in response to the memory not being available to buffer the command
   instructions for providing the command to the external device, the providing comprising the writing the first chunk of the command to the first hardware register field and the writing the size of the command to the second hardware register field;
   instructions to determine whether a response to the command is available from the external device and, in response to determining that the response is available:
      read a size of the response from the second hardware register field and to read a first chunk of the response from the first hardware register field, wherein the first chunk of the response comprises all or a portion of the response.

16. The computer-readable storage medium of claim 15, wherein:
   the one or more programs further comprise instructions to store a specified value in a third hardware register field when memory is not available to buffer the command; and
   the instructions to write the first chunk of the command comprise instructions to write the first chunk of the command to the first hardware register field in response to the third hardware register field storing the specified value.

17. The computer-readable storage medium of claim 15, wherein the one or more programs further comprise:
   instructions to repeatedly determine that the external device has read respective chunks of the command from the first hardware register field, the respective chunks including the first chunk;
   instructions to repeatedly write the respective chunks of the command to the first hardware register field; and
   instructions to repeatedly write remaining sizes of the command to the second hardware register field.

18. The computer-readable storage medium of claim 15, wherein the one or more programs further comprise:
   instructions to set a fourth hardware register field to instruct the external device to abort processing of the command; and
   instructions to set a fifth hardware register field to instruct the external device that transmission of the command is being aborted.

* * * * *